United States Patent
Fleischhaker et al.

(10) Patent No.: US 10,597,475 B2
(45) Date of Patent: *Mar. 24, 2020

(54) POLYMERS CONTAINING S-VINYLTHIO ALKANOLS

(71) Applicant: BASF SE, Ludwigshafen (DE)

(72) Inventors: Friederike Fleischhaker, Ludwigshafen (DE); Christian Schade, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 588 days.

This patent is subject to a terminal disclaimer.

(21) Appl. No.: 15/031,954

(22) PCT Filed: Oct. 6, 2014

(86) PCT No.: PCT/EP2014/071321
§ 371 (c)(1),
(2) Date: Apr. 25, 2016

(87) PCT Pub. No.: WO2015/062814
PCT Pub. Date: May 7, 2015

(65) Prior Publication Data
US 2016/0272747 A1    Sep. 22, 2016

(30) Foreign Application Priority Data

Oct. 30, 2013   (EP) .................................... 13190780

(51) Int. Cl.
| | | |
|---|---|---|
| *C08F 228/04* | (2006.01) | |
| *C08F 220/06* | (2006.01) | |
| *C08F 228/02* | (2006.01) | |
| *C09D 5/08* | (2006.01) | |
| *C09D 133/02* | (2006.01) | |

(52) U.S. Cl.
CPC .......... *C08F 228/04* (2013.01); *C08F 220/06* (2013.01); *C08F 228/02* (2013.01); *C09D 5/08* (2013.01); *C09D 133/02* (2013.01)

(58) Field of Classification Search
CPC .................................................. C08F 228/04
See application file for complete search history.

(56) References Cited

U.S. PATENT DOCUMENTS

| | | | |
|---|---|---|---|
| 2,933,479 A | | 4/1960 | McBurney et al. |
| 3,585,167 A | * | 6/1971 | Naarmann et al. .... C08G 18/00 524/315 |

FOREIGN PATENT DOCUMENTS

| | | | |
|---|---|---|---|
| CN | 2058120 A1 | 5/1972 | |
| DE | 2048664 A1 * | 4/1972 | .............. C08F 20/62 |
| DE | 20 55 893 | 5/1972 | |
| DE | 21 28 681 | 12/1972 | |

OTHER PUBLICATIONS

Machine translation of DE-2048664-A1 (Year: 1972).*
International Search Report dated Oct. 24, 2014 in PCT/EP2014/071321 (with English language translation).
International Preliminary Report on Patentability dated Dec. 14, 2015 in PCT/EP2014/071321 (with English language translation).
A. I. Vorob'eva, et al. "Effect of Medium on Copolymerization of Vinyl-2-Hydroxyethyl Sulfide with N-Vinylpyrrolidone" Russian Academy of Sciences, vol. 46, No. 7, 2004, pp. 1239-1243 (with English Abstract only).

* cited by examiner

*Primary Examiner* — Wenwen Cai
(74) *Attorney, Agent, or Firm* — Oblon, McClelland, Maier & Neustadt, L.L.P.

(57) ABSTRACT

Process for preparing polymers comprising S-vinylthioalkanol as monomer by radical polymerization, the polymerization being carried out in aqueous solution, with the proviso that no N-vinylpyrrolidone as monomer is used for preparing the polymers, and also polymers prepared by such processes. Copolymer consisting of S-vinyl-2-thioethan-1-ol and one or more ethylenically unsaturated monomers selected from the group consisting of acrylic acid, itaconic acid, maleic acid, maleic anhydride, and vinylphosphonic acid. Mixtures, preferably aqueous compositions, comprising polymers or copolymers. Use of polymers, copolymers, or aqueous compositions as concrete plasticizers, wetting agents, in cosmetics, as adhesive constituent, in emulsion polymerization, for metal surface treatment, in coatings applications, in paints, in laundry detergents, in washing detergents, as encapsulating material or as enveloping material.

2 Claims, No Drawings

POLYMERS CONTAINING S-VINYLTHIO ALKANOLS

The present invention relates to processes for preparing polymers comprising S-vinylthioalkanol as monomer. Further subject matter of the invention are polymers prepared according to such processes, and specific copolymers. Subject matter of the invention, furthermore, are the uses of such polymers and mixtures comprising such polymers.

Further embodiments of the present invention can be found in the claims, the description, and the examples. It is taken as read that the features of the subject matter of the invention that have been stated above, and those still to be illustrated below, may be used not only in the specific combination indicated in each case, but also in other combinations, without departing the scope of the invention. Preferred and very preferred, respectively, are also, in particular, those embodiments of the present invention in which all features of the subject matter of the invention have the preferred and very preferred definitions, respectively.

Reactive monomers with alkoxylate substituents find application in a very wide variety of technical fields—for example, as concrete plasticizers or as a constituent of varnishes, inks, and paints. One known reactive monomer is 4-hydroxybutyl vinyl ether (HBVE). Radical homopolymerization of vinyl ethers leads generally only to oligomers. Water as solvent cannot be used as solvent owing to the high susceptibility of the vinyl ethers to hydrolysis.

S-Vinylthioalkanols are likewise suitable as reactive monomers with alkoxylate substituents.

Copolymers of S-vinyl-2-thioethan-1-ol with N-vinylpyrrolidone are known from Vorob'eva et al., Vysokomolekulyarne Soedineniya Ser. B, 46, 1239-1243 (2004). These copolymers are prepared in bulk or in solvents. Water is among the solvents cited.

Copolymers of S-vinyl-2-thioethan-1-ol with N,N-dimethyl-N,N-diallylammonium chloride are known from Vorob'eva et al., Vysokomolekulyarne Soedineniya Ser. B, 46, 364-368 (2004).

Copolymers of S-vinyl-2-thioethan-1-ol with methyl methacrylate, acrylamide, and acrylonitriles, which are prepared in bulk, are known from DE 2055893 A1.

Copolymers of S-vinyl-2-thioethan-1-ol with styrene and acrylates, prepared in organic solvents, are known from DE 2128681 A1.

Furthermore, Vorob'eva et al., Vysokomolekulyarne Soedineniya Ser. B, 45, 700-704 (2003) disclose copolymers with acrylamide, styrene, and methyl methacrylate, which are prepared in DMSO as solvent.

With the polymers of the prior art, problems are encountered during their preparation. For example, in the course of polymerization or copolymerization, vinyl ethers do not display particularly high reactivity, and also lead to certain side reactions. Some of the vinyl ethers, HBVE for example, have only limited hydrolytic stability, especially in an acidic environment.

It was an object of the present invention to provide polymers which do not have the disadvantages identified above. One component of the object of the invention was the development of reactive monomers with alkoxylate substituents for an efficient polymerization reaction. Another component of the object of the present invention was that of providing compounds which, both as monomer and when copolymerized into the polymer, exhibit an increased hydrolytic stability.

As is evident from the disclosure content of the present invention, these and other objects are achieved by the various embodiments of the invention, more particularly by processes for preparing polymers comprising S-vinylthioalkanol as monomer by radical polymerization, the polymerization being carried out in aqueous solution, with the proviso that no N-vinylpyrrolidone as monomer is used for preparing the polymers, preferably in an aqueous solution whose solvent mixture comprises at least 50 weight % of water, more preferably at least 80 weight % of water, more particularly 100 weight % of water, based in each case on the solvent mixture.

S-Vinylthioalkanols are available commercially or may be prepared, for example, from ethyne (acetylene) and thioalcohols by the Reppe process or by other processes known to the skilled person.

One preferred embodiment of the process of the invention uses, as S-vinylthioalkanol, unsaturated compounds of the general formula (I)

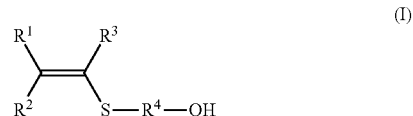

where
$R^1$, $R^2$, and $R^3$ independently of one another, identically or differently, are H or $CH_3$, preferably H, and
$R^4$ is linear or branched $C_1$-$C_{30}$ alkylene, preferably $C_2$-$C_{10}$ alkylene, more preferably $C_2$-$C_4$ alkylene, more particularly —$CH_2$—$CH_2$—.

Expressions of the form $C_a$-$C_b$ refer in the context of this invention to chemical compounds or substituents having a defined number of carbon atoms. The number of carbon atoms may be selected from the entire range from a to b, including a and b; a is at least 1 and b is always greater than a. Further specification of the chemical compounds or of the substituents is made using expressions of the form $C_a$-$C_b$ V. V here stands for a class of chemical compound or substituent class, such as for alkyl compounds or alkyl substituents.

The collective terms indicated for the various substituents have the following specific definition:

$C_1$-$C_{30}$ Alkylene: straight-chain or branched hydrocarbon radicals having 1 to 30 carbon atoms, as for example $C_1$-$C_{10}$ alkylene or $C_{11}$-$C_{20}$ alkylene, preferably $C_1$-$C_{10}$ alkylene, more particularly methylene, dimethylene, trimethylene, tetramethylene, pentamethylene, or hexamethylene.

With particular preference, the S-vinylthioalkanol is selected from the group consisting of S-vinyl-2-thioethan-1-ol, S-vinyl-2-thiopropan-1-ol, S-vinyl-1-thiopropan-2-ol, S-vinyl-2-thiobutan-1-ol, S-vinyl-1-thiobutan-2-ol, S-vinyl-2-thiopentan-1-ol, S-vinyl-1-thiopentan-2-ol, S-vinyl-2-thiocyclohexan-1-ol, S-vinyl-2-thio-($C_{12}$-$C_{22}$)-1-ol, S-vinyl-1-thio-($C_{12}$-$C_{22}$)-2-ol, S-vinyl-1-thiopropane-2,3-diol, S-vinyl-2-thiopropane-1,3-diol, 1-phenyl-S-vinyl-1-thioethan-2-ol, and 1-phenyl-S-vinyl-2-thioethan-1-ol. The S-vinylthioalkanol is preferably selected from the group consisting of S-vinyl-2-thioethan-1-ol, S-vinyl-1-thiopropan-2-ol, and S-vinyl-1-thiopropane-2,3-diol; more preferably the S-vinylthioalkanol is S-vinyl-2-thioethan-1-ol.

Another preferred embodiment of the process of the invention uses at least one further monomer, different from an S-vinylthioalkanol, for preparing the polymers, with the proviso, as already mentioned, that no N-vinylpyrrolidone as monomer is used for preparing the polymers.

Preference is given to using as at least one further monomer a monoethylenically unsaturated water-soluble monomer, with the exception of vinylpyrrolidone. With particular preference the one monoethylenically unsaturated water-soluble monomer is selected from the group consisting of monoethylenically unsaturated water-soluble monomer having one or more acid groups, monoethylenically unsaturated water-soluble monomer having one or more ester groups, monoethylenically unsaturated water-soluble monomer having one or more amide groups, monoethylenically unsaturated water-soluble monomer having one or more anhydride groups, monoethylenically unsaturated water-soluble monomer having one or more quaternized nitrogen groups, and monoethylenically unsaturated water-soluble monomer having one or more heteroaromatic groups. Especially preferred as monoethylenically unsaturated water-soluble monomers are (meth)acrylic acid, maleic acid, maleic anhydride, itaconic acid, vinylphosphonic acid, 2-acrylamido-2-methylpropanesulfonic acid, vinylimidazole, tri(m)ethylammonioethyl (meth)acrylate with chloride or methylsulfate counterion, tri(m)ethylammonioethyl/propyl(meth)acrylamide with chloride or methylsulfate counterion, methyl-, alkyl-(PEG)x-, (where x is a number from 200 to 10 000), hydroxyethyl, hydroxypropyl, dimethylaminoethyl or ureido(meth)acrylate, (meth)acrylamide, dimethyl(meth)acrylamide, dimethylaminopropyl (meth)acrylamide, methacrylamidoethylethyleneurea, or N-vinylformamide.

A particularly preferred embodiment of the process of the invention uses acrylic acid as monoethylenically unsaturated monomer. More particularly, besides S-vinyl-2-thioethan-1-ol and acrylic acid, no further monomers are used for preparing the polymers.

In another embodiment of the process of the invention, the polymers prepared have an upper critical solution temperature (UCST) in water of 0 to 99° C., preferably of room temperature (21° C.) to 90° C., more particularly of 30 to 80° C.

A further advantage of the process of the invention is that it allows the preparation of polymers and copolymers with a readily controllable UCST, more particularly a UCST in water. This applies in particular to copolymers consisting of acrylic acid and S-vinyl-2-thioethan-1-ol. The level of the UCST here is adjusted via the acrylic acid fraction. A polymer of S-vinyl-2-thioethan-1-ol/acrylic acid (50/50 molar ratio) has a UCST in water of about 50° C., a polymer of S-vinyl-2-thioethan-1-ol/acrylic acid (40/60 molar ratio) has a UCST of about 37° C., and a polymer of S-vinyl-2-thioethan-1-ol/acrylic acid (20/80 molar ratio) is completely soluble in water. A homopolymer of S-vinyl-2-thioethan-1-ol is not soluble in water, but instead, in contrast, is present only as a suspension in water.

The amount of S-vinylthioalkanol employed in the process of the invention may vary over a wide range according to the application of the polymer. In the context of the process of the invention, generally from 1 to 99 mol % of S-vinylthioalkanol, preferably from 20 to 80 mol %, more preferably from 30 to 70 mol % is used, based on the total amount of monomers.

Correspondingly, in the context of the process of the invention, from 1 to 99 mol % of S-vinyl-2-thioethan-1-ol, preferably 20 to 80 mol %, more preferably 30 to 70 mol %, and from 99 to 1 mol %, preferably 80 to 20 mol %, more preferably 70 to 30 mol % of further monomers are used, based on the total amount of monomers. More particularly from 1 to 99 mol % of S-vinyl-2-thioethan-1-ol, preferably from 20 to 80 mol %, more preferably from 30 to 70 mol %, and from 99 to 1 mol %, preferably from 80 to 20 mol %, more preferably from 70 to 30 mol % of acrylic acid are used, based on the total amount of monomers.

The invention further provides polymers prepared by the process of the invention, preferably hydrolysis-stable polymers.

The invention further provides copolymers, preferably hydrolysis-stable copolymers, consisting of S-vinyl-2-thioethan-1-ol and one or more ethylenically unsaturated monomers selected from the group consisting of acrylic acid, itaconic acid, maleic acid, maleic anhydride, and vinylphosphonic acid. Preferred copolymers are those consisting of S-vinyl-2-thioethan-1-ol and acrylic acid.

The invention further provides mixtures, preferably aqueous compositions, comprising the aforementioned polymers prepared by the process of the invention. Preferred are aqueous compositions which comprise at least 50 weight % of water, more preferably at least 80 weight % of water, more particularly 100 weight % of water, based on the total amount of solvent. These mixtures or aqueous compositions have a pH of 2 to 10, more preferably a pH of 4 to 8, more particularly a pH of 5 to 7.

The invention further provides for the use of the aforementioned polymers prepared by the process of the invention, or of mixtures, preferably aqueous compositions, comprising such polymers, as concrete plasticizers, wetting agents, in cosmetics, as an adhesive constituent, in emulsion polymerization, for metal surface treatment, in coatings applications, in paints, in laundry detergents, in washing detergents, as encapsulating material or as enveloping material.

The present invention provides reactive, hydrolysis-stable S-vinylthioalkanols which can be efficiently reacted to hydrolysis-stable polymers and copolymers. The polymers and copolymers are likewise largely stable toward bases and acids in terms of hydrolysis on the hydroxyalkyl group. The S-vinylthioalkanols are therefore suitable, for example, as a hydrolysis-stable substitute for hydroxyalkyl (meth)acrylates.

For example, hydroxyethyl acrylate is about 70% hydrolyzed in water at a pH of 13 after 60 minutes; S-vinyl-2-thioethan-1-ol hardly hydrolyzes at all under these basic conditions.

In particular, these monomers are stable in aqueous solution on radical polymerization, and the resulting polymers are stable in aqueous solution on storage. Analogous vinyl ether alcohols, indeed, are not hydrolysis-stable on radical polymerization in water—in the presence of acids, acetaldehyde and the corresponding diol are formed, but not a polymer.

Moreover, the S-vinylthioalkanols are even hydrolysis-stable on copolymerization (even with acids such as acrylic acid) or itaconic acid and on storage of the copolymers in aqueous solution.

The invention is elucidated in more detail by the examples, without the examples restricting the subject matter of the invention.

EXAMPLES

Measurement Methods:
K Values:
The K values were measured in accordance with H. Fikentscher, Cellulose-Chemie, vol. 13, pages 58 to 64 and 71 to 74 (1932) in 1 weight % strength aqueous or methanolic solution at 25° C.

GPC Measurement:

The GPC measurements were conducted in N,N-dimethylacetamide (DMAC) with polymethyl methacrylate (PMMA) (molecular weight distribution of from M=800 to M=1 820 000) as standard. Columns used:

| Columns | | | | |
|---|---|---|---|---|
| Diameter mm | Length cm | Separation material | Cutoff point g/mol | Designation |
| 8 | 5 | Polyester copolymer | | GRAM preliminary column |
| 8 | 30 | Polyester copolymer | 100-10 000 | GRAM 30 A |
| 8 | 30 | Polyester copolymer | 1000-1 000 000 | GRAM 1000 A |
| 8 | 30 | Polyester copolymer | 1000-1 000 000 | GRAM 1000 A |

Example 1: Preparation of S-vinyl-2-thioethan-1-ol/acrylic acid copolymer (ratio 50 mol/50 mol)

A reactor vessel provided with stirrer, temperature monitoring, nitrogen inlet, and a number of feed ports was charged with 58.0 g of deionized water, 1.3 g of feed 1, 1.2 g of feed 2, and 1.1 g of feed 3.

Feed 1: 26 g of S-vinyl-2-thioethan-1-ol.

Feed 2: 18 g of acrylic acid and 6 g of deionized water.

Feed 3: 1.32 g of azo initiator (2,2'-azobis[2-(2-imidazolin-2-yl)propane] dihydrochloride, Wako VA-044) and 20 g of deionized water.

The initial charge was gassed with nitrogen for 15 minutes and heated to 70° C. under a nitrogen atmosphere. Then the remainder of feed 1 and of feed 2 was added dropwise over the course of 3 hours, and the remainder of feed 3 over the course of 4 hours.

This was followed by stirring at 70° C. for 2 hours. The result was a pale yellow, clear polymer solution having a solids content of 29.8% and a K value of 23.2 (1% in methanol).

GPC gave an Mn of 3348 g/mol, an Mw of 6026 g/mol, and PDI (Mw/Mn) of 1.8 (calibration plot for PMMA).

Neither residual monomer nor hydrolysis products of S-vinyl-2-thioethan-1-ol were detectable by $^1$H NMR spectroscopy. In order to detect potential hydrolysis products, $^1$H NMR standard-addition tests were additionally conducted with 2-thioethan-1-ol and also with ethylene glycol.

The upper critical solution temperature (UCST) of the copolymer in water was about 50° C.

Example 2: Preparation of S-vinyl-2-thioethan-1-ol/acrylic acid copolymer (ratio 40 mol/60 mol)

A reactor vessel provided with stirrer, temperature monitoring, nitrogen inlet, and a number of feed ports was charged with 63.8 g of deionized water, 1.5 g of feed 1, 2.5 g of feed 2, and 1.6 g of feed 3.

Feed 1: 29.2 g of S-vinyl-2-thioethan-1-ol.

Feed 2: 30.3 g of acrylic acid and 20.0 g of deionized water.

Feed 3: 1.8 g of Wako VA-044 and 30 g of deionized water.

The initial charge was gassed with nitrogen for 15 minutes and heated to 70° C. under a nitrogen atmosphere. Than the remainder of feed 1 and of feed 2 was added dropwise over the course of 3 hours, and the remainder of feed 3 over the course of 4 hours.

This was followed by stirring at 70° C. for 2 hours. The result was a pale yellow, clear polymer solution having a solids content of 27.6% and a K value of 24.7 (1% in methanol).

Neither residual monomer nor hydrolysis products of S-vinyl-2-thioethan-1-ol were detectable by $^1$H NMR spectroscopy. In order to detect potential hydrolysis products, $^1$H NMR standard-addition tests were additionally conducted with 2-thioethan-1-ol and also with ethylene glycol.

The upper critical solution temperature (UCST) of the copolymer in water was about 37° C.

Example 3: Preparation of S-vinyl-2-thioethan-1-ol Homopolymer

A reactor vessel provided with stirrer, temperature monitoring, nitrogen inlet, and a number of feed ports was charged with 29.8 g of deionized water, 30.0 g of ethanol, 2.0 g of feed 1 and 1.1 g of feed 2.

Feed 1: 41.7 g of S-vinyl-2-thioethan-1-ol.

Feed 2: 1.25 g of Wako VA-044 and 20 g of deionized water.

Feed 3: 0.83 g of Wako VA-044 and 13.33 g of water.

The initial charge was gassed with nitrogen for 15 minutes and heated to 70° C. under a nitrogen atmosphere. Then the remainder of feed 1 was added dropwise over the course of 3 hours, and the remainder of feed 2 over the course of 4 hours. This was followed by stirring at 70° C. for 2 hours. Subsequently feed 3 was added dropwise over the course of 45 minutes and stirring took place at 70° C. for 2 hours.

The result was a pale yellow, clear polymer solution having a solids content of 28.3% and a K value of 23.3 (1% in methanol).

The residual monomer content was about 2 mol %, based on the total amount of monomer employed. GPC gave an Mn of 6718 g/mol, an Mw of 16 680 g/mol, and PDI 2.5 (calibration plot for PMMA).

Example 4: Preparation of S-vinyl-2-thioethan-1-ol/acrylic acid copolymer (ratio 10 mol/90 mol)

A reactor vessel provided with stirrer, temperature monitoring, nitrogen inlet, and a number of feed ports was charged with 73.6 g of deionized water, 6.0 g of feed 1 and 2.25 g of feed 2.

Feed 1: 77.82 g of acrylic acid, 12.50 g of S-vinyl-2-thioethan-1-ol, and 30.0 g of deionized water.

Feed 2: 5.42 g of azo initiator (2,2'-azobis(2-methylpropionamidine) dihydrochloride, Wako V-50) and 40.0 g of deionized water.

The initial charge was gassed with nitrogen for 15 minutes and heated to 88° C. under a nitrogen atmosphere. Then the remainder of feed 1 was added dropwise over the course of 3 hours, and the remainder of feed 2 over the course of 4 hours. This was followed by stirring at 88° C. for 2 hours.

The result was a pale yellow, clear polymer solution having a solids content of 40.6% and a K value of 12.7 (1% in water).

Neither residual monomer nor hydrolysis products of S-vinyl-2-thioethan-1-ol were detectable by $^1$H NMR spectroscopy. In order to detect potential hydrolysis products, $^1$H NMR standard-addition tests were additionally conducted with 2-thioethan-1-ol and also with ethylene glycol.

Example 5: Preparation of
S-vinyl-2-thioethan-1-ol/acrylic acid copolymer
(ratio 20 mol/80 mol)

A reactor vessel provided with stirrer, temperature monitoring, nitrogen inlet, and a number of feed ports was charged with 79.75 g of deionized water, 6.2 g of feed 1 and 2.3 g of feed 2.

Feed 1: 69.18 g of acrylic acid, 25.0 g of S-vinyl-2-thioethan-1-ol, and 30.0 g of deionized water.

Feed 2: 5.65 g of Wako V-50 and 40.0 g of deionized water.

The initial charge was gassed with nitrogen for 15 minutes and heated to 88° C. under a nitrogen atmosphere. Then the remainder of feed 1 was added dropwise over the course of 3 hours, and the remainder of feed 2 over the course of 4 hours. This was followed by stirring at 88° C. for 2 hours.

The result was a pale yellow, clear polymer solution having a solids content of 39.2% and a K value of 10.5 (1% in water).

Neither residual monomer nor hydrolysis products of S-vinyl-2-thioethan-1-ol were detectable by $^1$H NMR spectroscopy. In order to detect potential hydrolysis products, $^1$H NMR standard-addition tests were additionally conducted with 2-thioethan-1-ol and also with ethylene glycol.

Example 6: Preparation of
S-vinyl-2-thioethan-1-ol/acrylic acid/itaconic
acid/vinylphosphonic acid copolymer (ratio 5
mol/55 mol/30 mol/10 mol)

A reactor vessel provided with stirrer, temperature monitoring, nitrogen inlet, and a number of feed ports was charged with 42.67 g of deionized water, 9.32 g of vinylphosphonic acid (95% strength), and 32.0 g of itaconic acid. The initial charge was gassed with nitrogen for 15 minutes and heated to 98° C. under a nitrogen atmosphere. Then 32.5 g of acrylic acid, 4.3 g of S-vinyl-2-thioethan-1-ol, and 30.0 g of deionized water were added dropwise over the course of 5 hours, and 3.1 g of Wako V-50 and 48.0 g of deionized water over the course of 6 hours. This was followed by stirring at 98° C. for 2 hours.

This gave a clear yellow polymer solution having a solids content of 39.9% and a K value of 13.0 (1% in water). 2.9 mol % of vinylphosphonic acid, based on the total amount of vinylphosphonic acid employed, was detectable in the $^1$H and $^{31}$P NMR spectrum.

Example 7: Application Examples

The copolymers from examples 4 and 5 were used for coating test panels of hot-dip-galvanized steel (Gardobond OE HDG 3; 105×190 m).

As a pretreatment, the test panels were immersed for 30 seconds in a mildly alkaline cleaning agent solution (Surtech 133 from Surtech) and then rinsed off immediately with fully demineralized water and subsequently dried using nitrogen. The clean panels were immersed for 1 second in a 25 weight % strength aqueous solution of the copolymer, squeezed off with a system of rollers, and dried in a forced-air drying cabinet at 160° C. for 12 seconds. In the course of this operation, the peak metal temperature (PMT) did not exceed 50° C.

The resulting test panels were investigated for their corrosion resistance in a DIN EN ISO 9227 salt spray test.

| Polymer | corroded area after salt spray test: |
|---|---|
| No coating | 100% (fully corroded) |
| AA/S-Vinyl-2-thioethan-1-ol 90/10 | about 30% |
| AA/S-Vinyl-2-thioethan-1-ol 80/20 | about 10% |

The data demonstrate the passivating effect through the copolymers of the invention.

The invention claimed is:

1. A polymer containing S-vinyl-2-thioethan-1-ol and acrylic acid wherein no further monomers are used.

2. The polymer according to claim 1, wherein from 1 to 99 mol % of S-vinyl-2-thioethan-1-ol and from 99 to 1 mol % of acrylic acid is used, based on the total amount of monomers.

* * * * *

UNITED STATES PATENT AND TRADEMARK OFFICE
CERTIFICATE OF CORRECTION

PATENT NO. : 10,597,475 B2
APPLICATION NO. : 15/031954
DATED : March 24, 2020
INVENTOR(S) : Friederike Fleischhaker et al.

Page 1 of 1

It is certified that error appears in the above-identified patent and that said Letters Patent is hereby corrected as shown below:

In the Specification

In Column 5, Line 67, delete "Than" and insert -- Then --, therefor.

In Column 8, Line 15, delete "(Surtech" and insert -- (Surtec --, therefor;
Line 16, delete "Surtech)" and insert -- Surtec) --, therefor.

Signed and Sealed this
Twenty-first Day of July, 2020

Andrei Iancu
*Director of the United States Patent and Trademark Office*